(12) United States Patent
Rocznik

(10) Patent No.: US 10,795,148 B2
(45) Date of Patent: Oct. 6, 2020

(54) MICROMECHANICAL COMPONENT, MICROMIRROR-BASED LASER SYSTEM, AND METHOD FOR MONITORING A MICROMIRROR-BASED LASER SYSTEM COMPRISING DUAL SENSOR DIODES FOR SENSING TEMPERATURE AND LIGHT INTENSITY

(71) Applicant: Robert Bosch GmbH, Stuttgart (DE)

(72) Inventor: Marko Rocznik, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 423 days.

(21) Appl. No.: 15/758,848

(22) PCT Filed: Sep. 15, 2016

(86) PCT No.: PCT/EP2016/071911
§ 371 (c)(1),
(2) Date: Mar. 9, 2018

(87) PCT Pub. No.: WO2017/046291
PCT Pub. Date: Mar. 23, 2017

(65) Prior Publication Data
US 2020/0233203 A1   Jul. 23, 2020

(30) Foreign Application Priority Data

Sep. 18, 2015 (DE) .......... 10 2015 217 938

(51) Int. Cl.
| G01J 1/44 | (2006.01) |
| G02B 26/08 | (2006.01) |
| G01J 1/42 | (2006.01) |

(52) U.S. Cl.
CPC ........ *G02B 26/0833* (2013.01); *G01J 1/4228* (2013.01); *G01J 1/44* (2013.01); *G01J 2001/4242* (2013.01); *G01J 2001/446* (2013.01)

(58) Field of Classification Search
CPC ...... G03B 21/53; H04N 9/317; H04N 9/3194; G01J 1/44; G01J 5/02; G01Q 20/02; G02B 26/02; G02B 26/0833; G02B 26/3584
(Continued)

(56) References Cited

U.S. PATENT DOCUMENTS

| 5,548,112 A | 8/1996 | Nakase et al. |
| 7,357,035 B2 * | 4/2008 | Liu .......................... G01F 1/28 374/E7.023 |

(Continued)

FOREIGN PATENT DOCUMENTS

| DE | 102013222585 A1 | 5/2015 |
| EP | 2091039 A2 | 8/2009 |

(Continued)

OTHER PUBLICATIONS

International Search Report dated Nov. 25, 2016, of the corresponding International Application PCT/EP2016/071911 filed Sep. 15, 2016.

*Primary Examiner* — Que Tan Le
(74) *Attorney, Agent, or Firm* — Norton Rose Fulbright US; Gerard Messina

(57) ABSTRACT

A micromechanical component for a micromirror-based laser system for detecting an incident laser beam. Two sensor diodes are situated on a shared substrate in the micromechanical component, only one of the two sensor diodes being designed as a photodiode. The further sensor diode supplies an output signal independent of an incidence of light. By comparing the two output signals of the two (Continued)

diodes, an incidence of light in the micromechanical component may be inferred.

11 Claims, 3 Drawing Sheets

(58) Field of Classification Search
USPC .............................. 250/214.1, 216, 239, 221
See application file for complete search history.

(56) References Cited

U.S. PATENT DOCUMENTS

| 7,428,995 | B1 | 9/2008 | Stern et al. |
| 2005/0146767 | A1 | 7/2005 | Richards |
| 2006/0175544 | A1 | 8/2006 | Nozaki et al. |
| 2006/0255250 | A1 | 11/2006 | Chong |
| 2015/0103321 | A1 | 4/2015 | Reiss et al. |

FOREIGN PATENT DOCUMENTS

| JP | S63158881 A | 7/1988 |
| JP | 2011075955 A | 4/2011 |
| KR | 101420437 B1 | 7/2014 |

\* cited by examiner

MICROMECHANICAL COMPONENT, MICROMIRROR-BASED LASER SYSTEM, AND METHOD FOR MONITORING A MICROMIRROR-BASED LASER SYSTEM COMPRISING DUAL SENSOR DIODES FOR SENSING TEMPERATURE AND LIGHT INTENSITY

FIELD

The present invention relates to a micromechanical component, and also a micromirror-based laser system including a micromechanical component. Furthermore, the present invention relates to a method for monitoring a micromirror-based laser system.

BACKGROUND INFORMATION

German Patent Application No. DE 10 2013 222 585 A1 describes a micro-projector including a laser light source and a movable micromirror for deflecting a laser beam. The micro-projector includes a laser light source, a laser being able to be operated in pulsed operation at a power which is greater than the greatest possible power in continuous operation.

Laser systems including micromirrors are employed in numerous fields of use. A laser is guided onto a movable micromechanical mirror. This mirror represents, together with its controller, a microelectromechanical system (MEMS). Inter alia, laser sources having high power classes are also used for such laser systems. They may represent a significant hazard potential. The proper functionality of the laser system therefore has to be checked during operation. In particular, it is to be ensured that a laser beam may not escape uncontrolled, for example, due to an accident-related destruction of the housing. Furthermore, a possible misuse of the laser system by opening of the housing or the like is also to be able to be detected. If proper operation of a laser system is not possible, the operation of the laser source thus has to be prevented.

There is therefore a demand for a micromirror-based laser system and in particular a micromechanical component for such a laser system which enables a check of the functionality in a simple and efficient manner.

SUMMARY

In accordance with a first aspect of the present invention, a micromechanical component is provided including a micromirror, a first sensor diode, and a second sensor diode. The micromirror is coupled to a carrier substrate. The first sensor diode is designed to provide a first output signal, which corresponds to a temperature at the first sensor diode. The second sensor diode is designed to provide a second output signal, which corresponds to a light intensity, which is incident on the second sensor diode. The first sensor diode and the second sensor diode are situated jointly in the carrier substrate.

According to another aspect, the present invention provides a method for monitoring a micromirror-based laser system including the steps of providing a first output signal, which corresponds to a temperature at a first sensor diode, and providing a second output signal, which corresponds to a light intensity incident on a second sensor diode. The method furthermore includes a step of comparing the first output signal to the second output signal, and a step of ascertaining a malfunction of the micromirror-based laser system based on the comparison of the first output signal to the second output signal.

In accordance with the present invention, the functionality of a laser system is verified in that two sensor diodes are situated on a shared carrier substrate in a micromechanical component of such a laser system. One of the two sensor diodes is designed as a photodiode and provides an output signal which corresponds to an incidence of light. A possible incidence of light in the micromechanical component may thus be detected by this photodiode. To compensate for possible interfering effects, the output signal of the photodiode is compared to an output signal of a further sensor diode. The further sensor diode is independent of an incidence of light inside the micromechanical component and supplies an output signal corresponding to a temperature. In this way, possible temperature influences on the photodiode may be compensated for. Since the photodiode and the further diode for temperature monitoring are situated on a shared carrier substrate, a particularly simple and cost-effective construction may be implemented.

In general, micromechanical components for laser systems already have a diode for temperature compensation. This diode structure may therefore be supplemented in a simple way with a further diode for light detection. Photodiode and further diode for temperature detection may be implemented in a joint work step on a shared carrier substrate.

In this way, reliable and simultaneously very efficient monitoring of the scattered light in the micromechanical component may be achieved. If no scattered light may be detected by the photodiode in the micromechanical component, a malfunction of the laser system may thus be inferred therefrom. In such a case, the further operation of the laser system may be entirely or partially prevented for safety reasons.

According to another specific embodiment of the present invention, the first sensor diode includes an opaque cover layer. By attaching an opaque cover layer on the first sensor diode, the output signal of this sensor diode may be made independent of a possible incidence of light. In this way, the first sensor diode supplies an output signal independent of the incidence of light inside the micromechanical component. This output signal may thereupon be used, on the one hand, for monitoring the temperature in the micromechanical component and, on the other hand, for compensating for possible interfering effects in the output signal of the photodiode.

According to another specific embodiment of the present invention, the micromechanical component includes a reflector. The reflector is designed to deflect light in the micromechanical component. In particular, the reflector may deflect the light in the micromechanical component in the direction of the second sensor diode. In this way, the light concentration may be increased at the second sensor diode, i.e., the photodiode. The photodiode may thus supply a stronger output signal.

According to another specific embodiment of the present invention, the micromirror of the micromechanical component includes an opening. The opening is situated between a mirror surface of the micromirror and a surface opposite to the mirror surface. In this way, light from a laser source which is incident on the mirror surface may also be conducted through the opening in the micromirror. It is therefore also possible to situate the second sensor diode for light detection behind the micromirror, i.e., in an area facing away from the mirror surface of the micromirror.

According to another specific embodiment of the present invention, a mirror surface of the micromirror includes a reflection element. The reflection element on the mirror surface of the micromirror may deflect incident light in a predetermined direction. The direction of the light thus deflected may differ from the direction of the light deflection by the mirror surface. In this way, light may be intentionally deflected onto a predetermined area of the micromechanical component by the reflection element on the mirror surface. The light thus deflected by the reflection element may thereupon be used for the detection by the second sensor diode.

According to another specific embodiment of the present invention, the second sensor diode is situated on a side of the carrier substrate which faces in the same direction as a mirror surface of the micromirror. Furthermore, the first sensor diode may also be situated on this side of the carrier substrate, which faces in the same direction as the mirror surface of the micromirror. A particularly large part of the scattered light in the micromechanical component may thus be detected by the second sensor diode.

Alternatively, the second sensor diode and/or the first sensor diode may also be situated on a side of the carrier substrate which faces in the opposite direction as the mirror surface of the micromirror.

According to another specific embodiment of the present invention, the first sensor diode and the second sensor diode include a shared doped semiconductor layer. A semiconductor structure including a first sensor diode and a second sensor diode may thereupon be implemented in this shared doped semiconductor layer by introducing two further doped semiconductor areas.

According to an alternative specific embodiment, the first sensor diode and the second sensor diode may be formed as separate semiconductor layers in a shared carrier substrate.

According to another aspect, the present invention provides a micromirror-based laser system including a laser source, a micromechanical component according to the present invention, and a monitoring device. The laser source is designed to provide a laser beam. The monitoring device is designed to determine a malfunction of the micromirror-based laser system based on the first sensor signal provided by the first sensor diode and the second output signal provided by the second sensor diode. In particular, the malfunction may be determined by comparing the first sensor signal to the second sensor signal. Upon detection of a malfunction, the micromirror-based laser system may deactivate the laser source.

According to another specific embodiment, the micromirror-based laser system includes a modulation source. The modulation source is designed to provide a modulation signal. The laser source is designed to modulate the provided laser beam based on the modulation signal. The monitoring device is designed to evaluate the output signal provided by the second sensor diode based on the modulation signal.

Further specific embodiments and advantages of the present invention result from the description below with reference to the figures.

BRIEF DESCRIPTION OF THE DRAWINGS

FIG. 9 shows a schematic representation of a flow chart of a method for monitoring a micromirror-based laser system, as one specific embodiment is based on.

DETAILED DESCRIPTION OF EXAMPLE EMBODIMENTS

Figure 1:
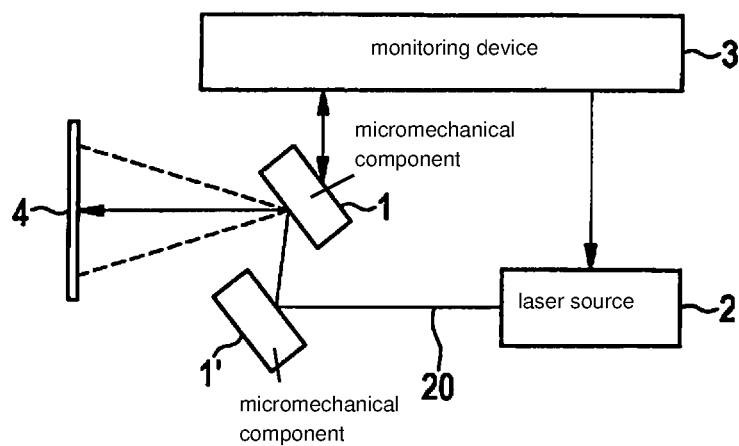
FIG. 1 shows a schematic representation of a micromirror-based laser system according to one specific embodiment.

FIG. 1 shows a schematic representation of a micromirror-based laser system according to one specific embodiment. A laser source 2 emits a laser beam 20. Laser beam 20 may thereupon be deflected by one or multiple micromechanical components 1 and 1'. Micromechanical components 1 and 1' deflect the laser beam in such a way that a predefined pattern is depicted, for example, on a phosphor screen 4. Phosphor screen 4 may additionally also be used, for example, for converting the wavelength of the laser light into light of another wavelength. The control of the micromechanical components may be carried out, for example, via suitable control electronics. In particular, these control electronics may also include a monitoring device 3, which checks the proper status of the laser system and deactivates laser source 2 in the event of the detection of a malfunction. For this purpose, monitoring device 3 may detect scattered light occurring in micromechanical component 1, for example. As long as scattered light is detected in micromechanical component 1 by laser beam 20, it may be presumed that the laser system is intact and the beam path of laser beam 20 extends correctly from laser source 2 up to micromechanical component 1. In contrast, if a sufficient quantity of scattered light is not detected in micromechanical component 1, although a laser beam 20 is emitted by laser source 2, the risk thus exists that the beam path of laser beam 20 takes an undesirable course and represents a possible risk to the surroundings. In this case, monitoring device 3 may deactivate laser source 2.

In the exemplary embodiment shown in FIG. 1, two micromechanical components 1 and 1' are situated in the beam path of laser beam 20 from laser source 2. However, this represents one exemplary specific embodiment only for better comprehension. In addition, more or fewer micromechanical components 1, 1' for deflecting laser beam 20 are also possible. In the case of more than one micromechanical component 1, 1', the scattered light is preferably detected in last micromechanical component 1, 1', i.e., in the component which represents the last micromechanical component in the course of the beam path viewed from laser source 2.

Figure 2:
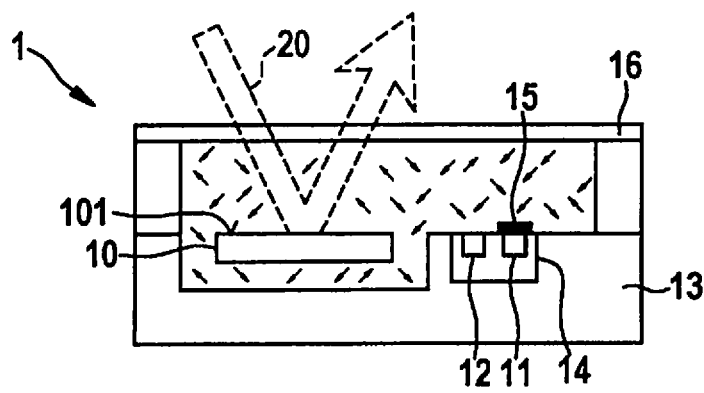
FIGS. 2 through 8 show schematic representations of micromechanical components according to various specific embodiments.

Such micromirror-based laser systems may be used in arbitrary areas of application, in which a deflection of a laser beam 20 by a micromechanical component 1 is to take place. FIG. 2 shows a schematic representation of a micromechanical component 1 according to one specific embodiment. Micromechanical component 1 includes a micromirror 10, a first sensor diode 11, and a second sensor diode 12. The two sensor diodes 11 and 12 are situated in a shared carrier substrate 13. Carrier substrate 13 may be formed, for example, from silicon. In particular, for example, it is possible that carrier substrate 13 is a carrier silicon, for example, made of p-doped silicon. A doped semiconductor layer 14 may be embedded in this carrier substrate 13. For example, an n-doped trench 14 may be embedded in a p-substrate 13. Two areas doped opposite to semiconductor layer 14 may in turn be embedded in this doped semiconductor layer 14. In the present example, these two areas may be, for example, p-doped. In this way, two diodes 11 and 12 are formed by shared semiconductor layer 14 and the two embedded areas having opposite doping. Alternatively, it is also possible to implement the two sensor diodes 11 and 12 in the form of two separate doped trenches in carrier substrate 13. If the two sensor diodes 11 and 12 are formed in separate trenches, a greater flexibility in the circuit construction may thus be achieved in this way. On the other hand, a shared trench for the two sensor diodes 11 and 12 results in a more compact construction and smaller space requirements.

One of these two diodes 11 may in particular be covered using an opaque cover layer 15. In this way, two sensor diodes 11 and 12 are formed in carrier substrate 13, a first sensor diode 11 having cover layer 15 providing an output signal independent of the ambient light. Second sensor diode 12 without a cover layer, in contrast, provides a second output signal, which provides the output signal dependent on light incident on second diode 12. The output signal of second diode 12 is therefore dependent both on the ambient light and on the temperature in carrier substrate 13, while the output signal of first diode 11 is only influenced by a temperature effect and is not dependent on the scattered light due to cover layer 15.

Micromirror 10 of micromechanical component 1 may be movably coupled via elements (not shown here) to carrier substrate 13. In particular, micromirror 10 of micromechanical component 1 has a mirror surface 101. A light beam 20 incident on micromirror 10, for example, the laser beam of laser source 2, is reflected by mirror surface 101 of micromirror 10. For better protection, micromechanical component 1 may be covered using a light-transmissive plate 16.

If laser beam 20 is applied to micromirror 10 of micromechanical component 1, scattered light thus arises in the interior of micromechanical component 1, which is also incident, inter alia, on second sensor diode 12. The output signal of second sensor diode 12 thus enables a detection of the scattered light in the interior of micromechanical component 1.

By way of the comparison of the two output signals from first sensor diode 11, which supplies an output signal independent of the scattered light due to cover layer 15, to the second output signal of second sensor diode 12, whose output signal is dependent on the scattered light in the interior of micromechanical component 1, it may thus be established whether laser beam 20 is incident on micromechanical component 1 and in particular on micromirror 10. For this purpose, first sensor diode 11 and second sensor diode 12 may also be energized by one shared or two separate current sources (not shown here) using an external electrical current. If laser beam 20 is incident on micromechanical component 1 and thus generates scattered light in the interior of micromechanical component 1, a voltage difference thus results between first sensor diode 11 and second sensor diode 12. Laser beam 20 may be detected in this way.

Figure 3:
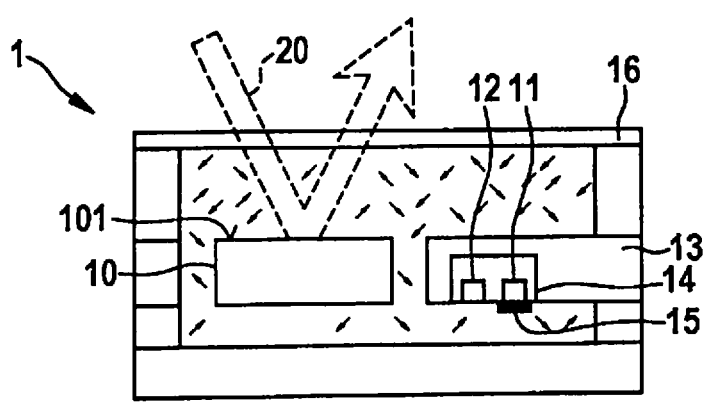

FIG. 3 shows a schematic representation of a micromechanical component according to another specific embodiment. This specific embodiment differs from the specific embodiment according to FIG. 2 in that first sensor diode 11 and second sensor diode 12 do not face in the same direction as mirror surface 101 of micromirror 100. Rather, first sensor diode 11 and second sensor diode 12 face in the opposite direction, i.e., in the opposite direction viewed with respect to mirror surface 110 of micromirror 10. Micromechanical component 1 has a gap between micromirror 10 and carrier substrate 13 and a base of micromechanical component 1. In this specific embodiment, scattered light may penetrate through the lateral gaps between carrier substrate 13 and micromirror 10, then penetrate into the lower gap of micromechanical component 1. This light may thereupon be detected by second sensor diode 12.

Figure 4:
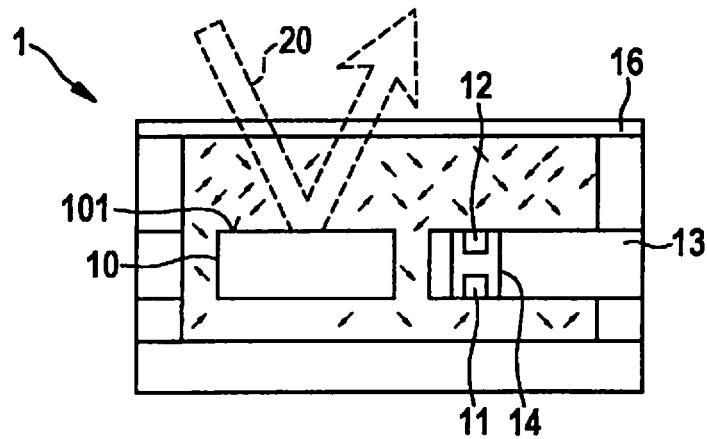

FIG. 4 shows another specific embodiment of a micromechanical component 1. First sensor diode 11 and second sensor diode 12 are situated on opposite sides of carrier substrate 13. First sensor diode 11 faces in the opposite direction viewed with respect to mirror surface 101 of micromirror 10, while second sensor diode 12 faces in the same direction in which mirror surface 101 is situated on micromirror 10. A substantially greater proportion of the scattered light is thus detected by second sensor diode 12 than may be detected by first sensor diode 11. If laser beam 20 is incident on micromirror 10 of micromechanical component 1, first sensor diode 11 and second sensor diode 12 thus also provide output signals of different strengths in this specific embodiment. An incidence of laser beam 20 may thus be detected.

Figure 5:
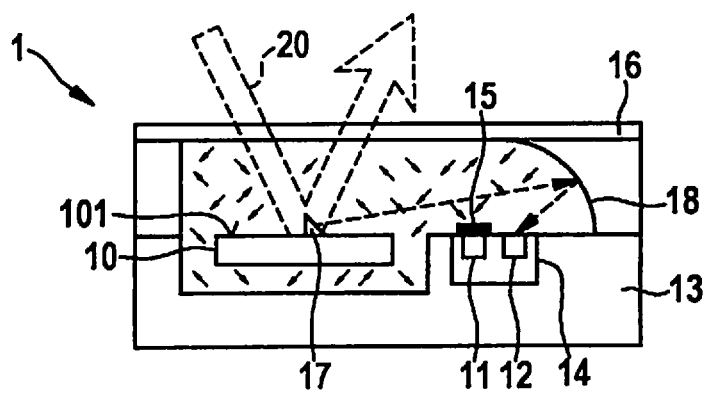

FIG. 5 shows another specific embodiment of a micromechanical component 1. This specific embodiment differs from the specific embodiment according to FIG. 2 in that a reflection element 17 is situated on mirror surface 101 of micromirror 10. This reflection element 17 is preferably smaller than the diameter of laser beam 20. In particular, reflection element 17 may have a width of only a few micrometers. Reflection element 17 may deflect a part of laser beam 20 onto a predetermined area of micromechanical component 1. Second sensor diode 12 for the detection of the light signal may be situated in this predetermined area of micromechanical component 1. Alternatively, a reflector 18 may also be situated in the predetermined area, onto which reflection element 17 deflects a part of laser beam 20. This reflector 18 may thereupon deflect the light of laser beam 20 deflected by reflection element 17 in the direction of second sensor diode 12. Alternatively, reflector 18 may also deflect the scattered light in the interior of micromechanical component 1 onto second sensor diode 12. Reflector 18 may optionally also be designed in such a way that it focuses the light on second sensor diode 12.

Figure 6:
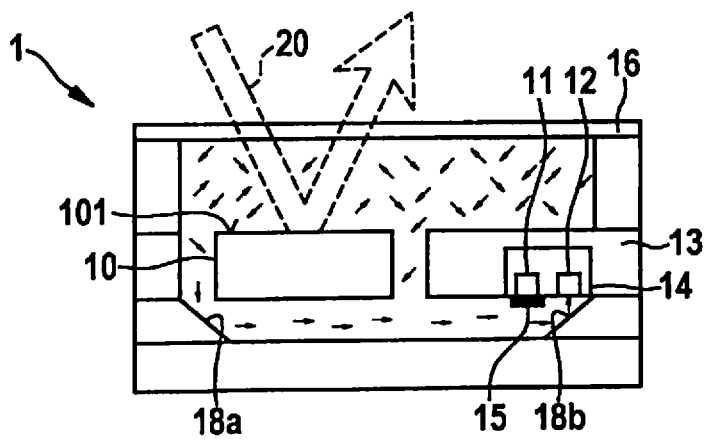

FIG. 6 shows another specific embodiment of a micromechanical component. The micromechanical component according to FIG. 6 differs from the specific embodiment according to FIG. 3 in that one or multiple reflectors 18a, 18b are situated in the lower area of micromechanical component 1, i.e., in the area which faces away from mirror surface 101 of micromirror 10. These reflectors 18a, 18b may deflect scattered light, which penetrates through a gap between carrier substrate 13 and micromirror 10 into the lower area of micromechanical component 1, further onto second sensor diode 12. Such mirrored surfaces 18a, 18b may be manufactured, for example, particularly simply by wet chemical etching, for example, etching using a potassium hydroxide (KOH) solution in a silicon wafer or another suitable way.

Figure 7:
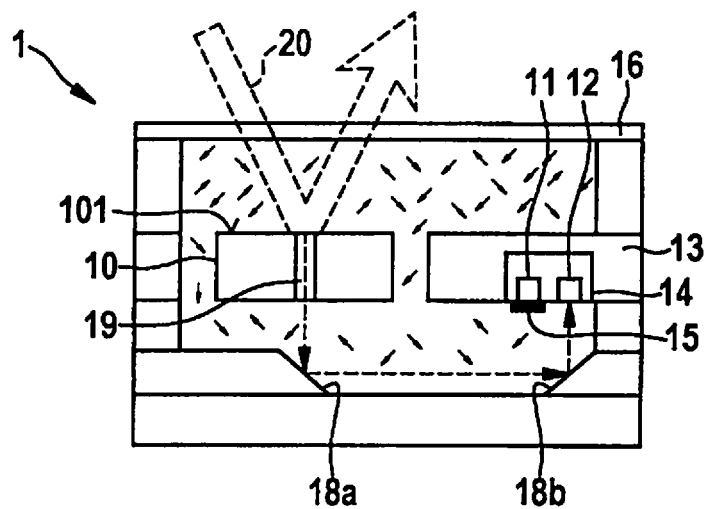

FIG. 7 shows another specific embodiment of a micromechanical component 1. This specific embodiment corresponds to the largest extent to the specific embodiment according to above-described FIG. 6. In addition, micromirror 1 has an opening 19 in this specific embodiment. This opening 19 connects the upper side of micromirror 10, on which mirror surface 101 is situated, to the lower side of micromirror 10 opposite to mirror surface 101. In this way, a part of the light from laser beam 20 may penetrate through opening 19 and reach the lower area of micromechanical component 1. The light of laser beam 20 penetrating through opening 19 may thereupon optionally be conducted via one or multiple reflectors 18a, 18b onto second sensor diode 12. Alternatively, second sensor diode 12 may also only detect scattered light penetrating through this opening 19 into the lower area without further reflectors 18a, 18b.

Figure 8:
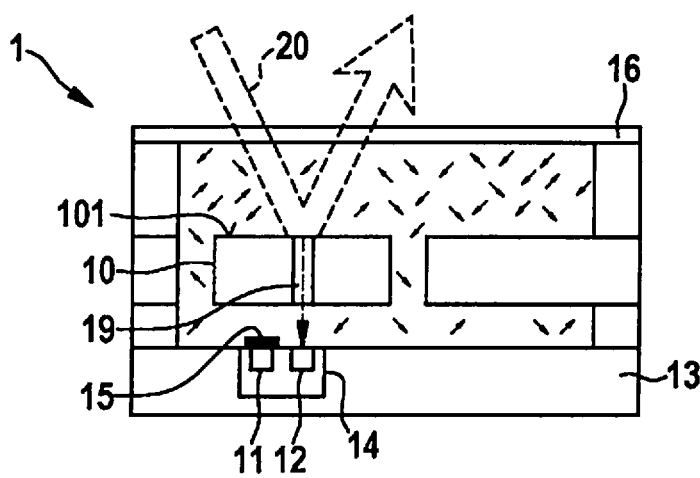

Finally, FIG. 8 shows another exemplary embodiment of a micromechanical component 1. The exemplary embodiment according to this figure differs from the exemplary embodiment of preceding FIG. 7 in that second sensor diode 12 is situated below micromirror 10 in direct extension of opening 19 in micromirror 10. In this way, the light of laser beam 20 penetrating through opening 19 may be incident directly on second sensor diode 12.

Alternatively, it is also possible to situate second sensor diode 12 in direct continuation of a gap between micromirror 10 and carrier substrate 13 in the lower area of micromechanical component 1.

In the specific embodiments in which first sensor diode 11 and second sensor diode 12 are situated in the lower area of micromechanical component 1, cover 15 of first sensor diode 1 may optionally also be omitted, if second sensor diode 12 is situated at a position which receives a large proportion of scattered light, while first sensor diode 11 only receives a smaller proportion of scattered light. This may be implemented, for example, in that second sensor diode 12 is situated directly below opening 19 in micromirror 10 or at a corresponding position of a gap between micromirror 10 and carrier substrate 13, while first sensor diode 11 is situated apart therefrom.

Monitoring device 3 of the micromirror-based laser system may, for example, simultaneously detect the output signals of first sensor diode 11 and second sensor diode 12 and compare them to one another. If the difference between the sensor signal and first sensor diode 11 and second sensor diode 12 exceeds a predefined threshold value, monitoring device 3 thus establishes that a laser beam 20 is also incident on micromechanical component 1. Otherwise, the absence of a laser beam 20 may be detected.

Alternatively, it is also possible that, for example, first sensor diode 11 and second sensor diode 12 are alternately energized by a shared current source (not shown here). In this way, it may be ensured that no significant deviations in the energizing of the two sensor diodes 11 and 12 occur due to component tolerances. Monitoring device 3 may in this case successively detect the sensor signal from first sensor diode 11 and second sensor diode 12 and thereupon also evaluate a difference between the two sensor signals.

Furthermore, it is also possible that laser beam 20 emitted by laser source 2 is modulated based on a modulation signal. This modulation signal may be provided, for example, by a modulation source in monitoring device 3. Further options for modulating laser beam 20 are also possible, however. In this case, monitoring device 3 may also carry out the evaluation of the sensor signal from second sensor diode 12 based on the corresponding modulation signal.

First sensor diode 11 and second sensor diode 12 may have an equal diode surface, for example, so that the two diodes 11 and 12 supply an approximately equal output voltage upon equal energization in the unlighted state. Alternatively, it is possible to dimension second sensor diode 12 for detecting the light larger than first sensor diode 11, which detects the temperature. The forward voltage of second sensor diode 12 is lower in the unlighted state due to such an asymmetry. The forward voltage of second sensor diode 12 increases due to an irradiation of second sensor diode 12, and the voltage signal of second sensor diode 12 is therefore greater than the voltage signal of first sensor diode 11. In this way, the presence or absence of laser beam 20 on micromechanical component 1 may be detected by a simple comparator circuit.

Figure 9:
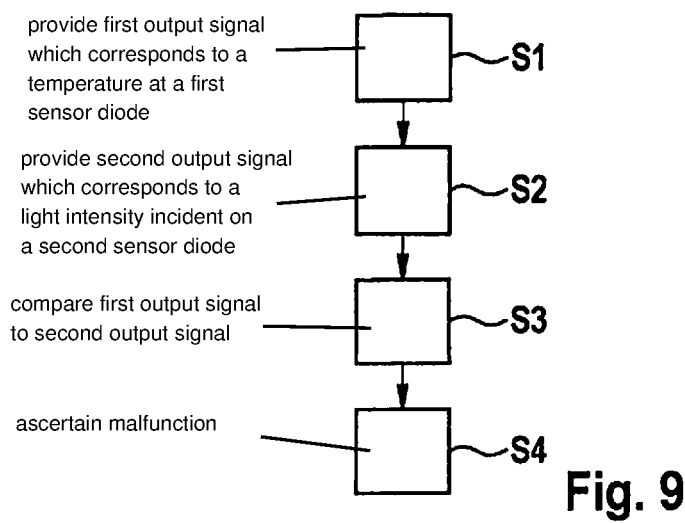

Finally, FIG. 9 shows a schematic representation of a flow chart, as a method for monitoring a micromirror-based laser system according to which one specific embodiment is based. In step S1, a first output signal is provided, which corresponds to a temperature at a first sensor diode. In step S2, a second output signal is provided, which corresponds to a light intensity incident on a second sensor diode. In step S3, the first output signal is compared to the second output signal. Steps S1 through S3, i.e., the provision of the two output signals and the comparison of the output signals, may take place simultaneously in particular. In step S4, a malfunction of the micromirror-based laser system may thereupon be ascertained. The ascertainment is based on the comparison of the first output signal to the second output signal. In particular, it may be established that the micromirror-based laser system is intact if the output signal of the second sensor diode due to the incident light intensity is greater than the output signal of the first sensor diode.

In summary, the present invention relates to a micromechanical component for a micromirror-based laser system for detecting an incident laser beam. For this purpose, two sensor diodes are situated on a shared substrate in the micromechanical component, only one of the two sensor diodes being designed as a photodiode. The further sensor diode supplies an output signal independent of an incidence of light. By comparing the two output signals of the two diodes, an incidence of light in the micromechanical component may be inferred.

What is claimed is:

1. A micromechanical component, comprising:
 a micromirror, which is coupled to a carrier substrate;
 a first sensor diode, which is designed to provide a first output signal which corresponds to a temperature at the first sensor diode; and
 a second sensor diode, which is designed to provide a second output signal which corresponds to a light intensity which is incident on the second sensor diode;
 wherein the first sensor diode and the second sensor diode are situated in the carrier substrate.

2. The micromechanical component as recited in claim 1, wherein the first sensor diode includes an opaque cover layer.

3. The micromechanical component as recited in claim 1, further comprising:
 a reflector, which is designed to deflect light in the micromechanical component in a direction of the second sensor diode.

4. The micromechanical component as recited in claim 1, wherein the micromirror includes an opening between a mirror surface and a surface of the micromirror opposite to the mirror surface.

5. The micromechanical component as recited in claim 1, wherein the micromirror includes a reflection element, which is situated on a mirror surface of the micromirror.

6. The micromechanical component as recited in claim 1, wherein the second sensor diode is situated on a side of the carrier substrate, which faces in a same direction as a mirror surface of the micromirror.

7. The micromechanical component as recited in claim 1, wherein the first sensor diode and the second sensor diode include a shared doped semiconductor layer.

8. The micromechanical component as recited in claim 1, wherein the first sensor diode and the second sensor diode include separate semiconductor layers in a shared carrier substrate.

9. A micromirror-based laser system, comprising:
 a laser source, which is designed to provide a laser beam;

a micromechanical component including a micromirror, which is coupled to a carrier substrate, a first sensor diode, which is designed to provide a first output signal which corresponds to a temperature at the first sensor diode, and a second sensor diode, which is designed to provide a second output signal which corresponds to a light intensity which is incident on the second sensor diode, the first sensor diode and the second sensor diode being situated in the carrier substrate; and a monitoring device, which is designed to determine a malfunction of the micromirror-based laser system based on the first sensor signal provided by the first sensor diode and the second output signal provided by the second sensor diode.

10. The micromirror-based laser system as recited in claim 9, further comprising:

a modulation source, which is designed to provide a modulation signal, the laser source being designed to modulate a provided laser beam based on the modulation signal, and the monitoring device being designed to evaluate the second output signal provided by the second sensor diode based on the modulation signal.

11. A method for monitoring a micromirror-based laser system, comprising:

providing a first output signal which corresponds to a temperature at a first sensor diode;

providing a second output signal which corresponds to a light intensity incident on a second sensor diode;

comparing the first output signal to the second output signal; and ascertaining a malfunction of the micromirror-based laser system based on the comparison of the first output signal to the second output signal.

\* \* \* \* \*